United States Patent [19]

Andre

[11] 4,036,319

[45] July 19, 1977

[54] HYDRAULIC SHOCK ABSORBER FOR A MOTOR VEHICLE HAVING FLOW CONTROL VALVING THAT BECOMES MORE RESTRICTIVE DURING THE SERVICE LIFE OF THE SHOCK ABSORBER

[75] Inventor: Lee R. Andre, Tecumseh, Mich.

[73] Assignee: Ford Motor Company, Dearborn, Mich.

[21] Appl. No.: 631,252

[22] Filed: Nov. 12, 1975

[51] Int. Cl.² .............................................. F16F 9/50
[52] U.S. Cl. .................................... 188/282; 188/317
[58] Field of Search ............... 188/282, 322, 317, 281, 188/280; 267/64 R, 65 R; 280/702; 137/493

[56] References Cited

U.S. PATENT DOCUMENTS

| 2,732,039 | 1/1956 | Funkhouser et al. | 188/282 |
| 2,740,500 | 4/1956 | Brundrett et al. | 188/322 |
| 3,470,986 | 10/1969 | Whisler, Jr. | 188/317 X |
| 3,874,487 | 4/1975 | Keijzer et al. | 188/322 |

*Primary Examiner*—Trygve M. Blix
*Assistant Examiner*—Douglas C. Butler
*Attorney, Agent, or Firm*—Clifford L. Sadler; Keith L. Zerschling

[57] ABSTRACT

A shock absorber for a motor vehicle suspension includes a piston construction having flow control valving that becomes more restrictive during the life of the shock absorber to compensate for the reduction in friction damping in the suspension during usage. The piston valving includes a flow passage surrounded at one of its ends by an annular land that forms a valve seat. A valve element is urged to a closed position against the seat by the cumulative force of a primary spring and a secondary spring. The secondary spring provides a spring force countering the force of the primary spring but is constructed to progressively take a permanent set after repeated cycling whereby the cumulative force of the two springs urging the valve element to a seated condition will increase during the service life of the shock absorber.

3 Claims, 9 Drawing Figures

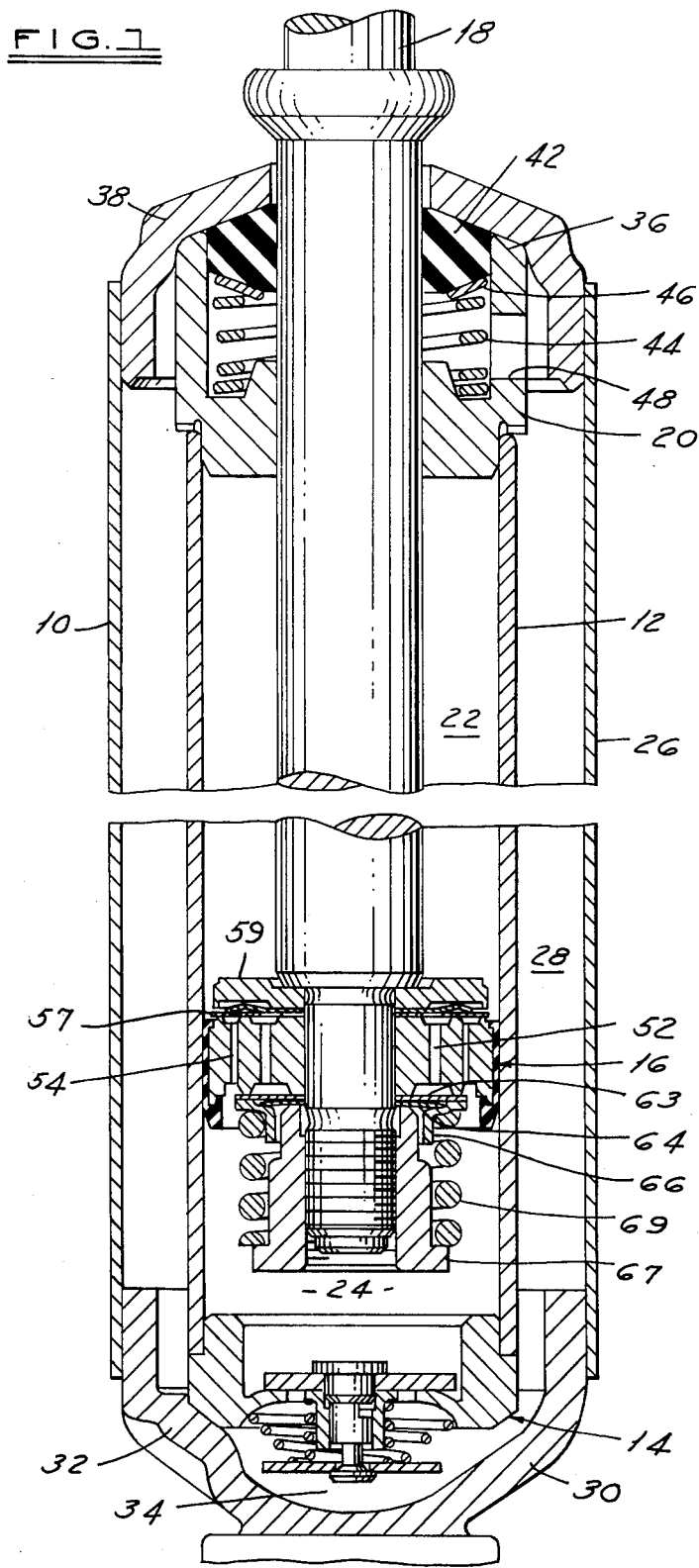

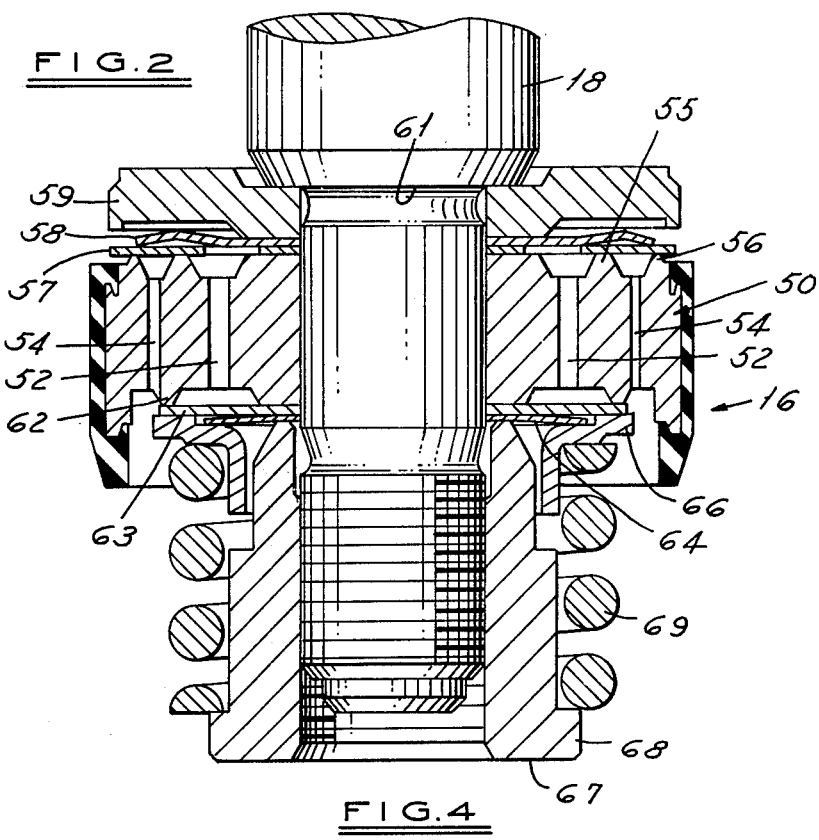
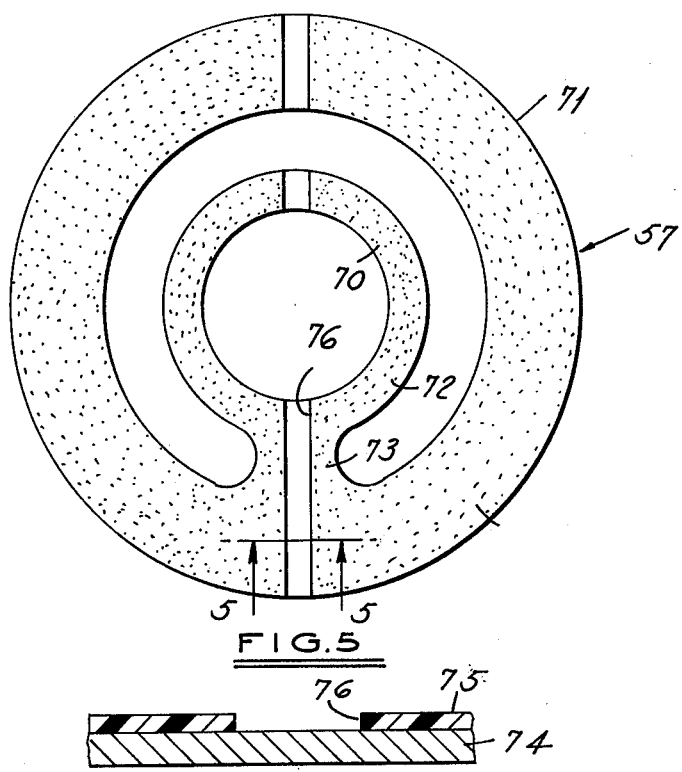

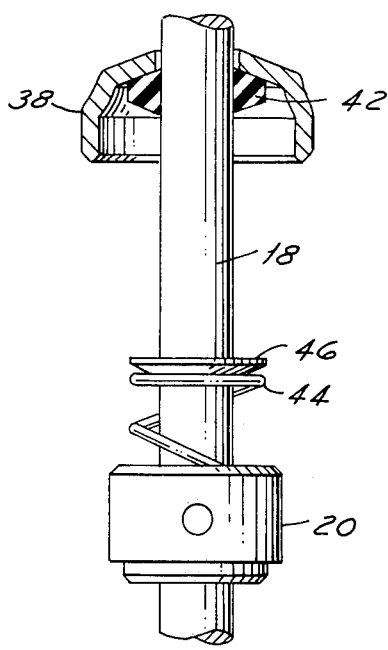
FIG.3
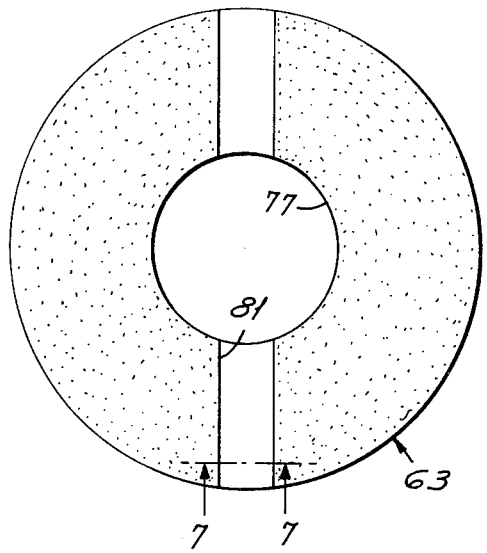
FIG.6
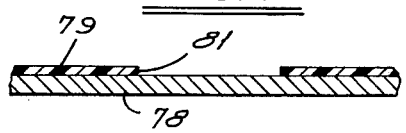
FIG.7
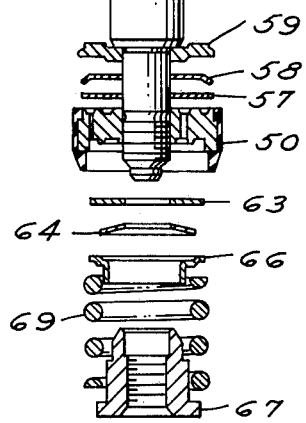
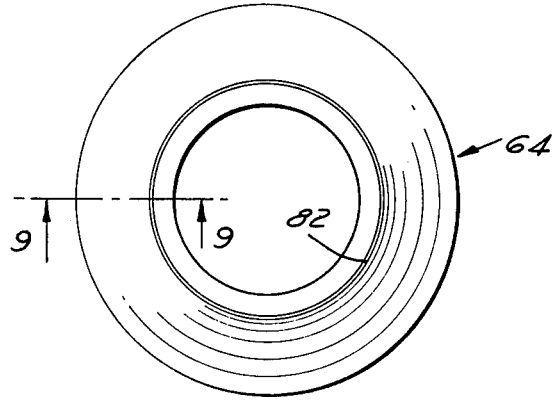
FIG.8
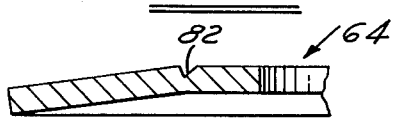
FIG.9

HYDRAULIC SHOCK ABSORBER FOR A MOTOR VEHICLE HAVING FLOW CONTROL VALVING THAT BECOMES MORE RESTRICTIVE DURING THE SERVICE LIFE OF THE SHOCK ABSORBER

BACKGROUND OF THE DISCLOSURE

The present invention relates to hydraulic shock absorbers for a motor vehicle suspension, and more particularly to a shock absorber constructed to become progressively stiffer during its service life.

In a conventional automotive suspension system, jounce and rebound movement is damped both by the friction in the system and by a hydraulic shock absorber. During repeated cycling of the suspension system, there will be a lessening of the friction in the various pivots and other components of the suspension due to wear and, consequently, a progressive reduction in friction damping. In order to compensate for changes in the friction damping characteristics of a vehicle suspension during its service life, it is an object of the present invention to provide a shock absorber that becomes progressively stiffer and increases its damping ability during its service life.

BRIEF SUMMARY OF THE DISCLOSURE

In accordance with the presently preferred embodiment of this invention, a hydraulic shock absorber for a motor vehicle has a pressure tube in which a piston is reciprocably mounted. The pressure tube is connected to an unsprung component of the vehicle suspension and the piston is connected by a piston rod to a sprung component such as a vehicle body or frame member.

The shock absorber piston divides the pressure tube into jounce and rebound pressure chambers and has jounce and rebound flow control passages. The passages permit the restricted flow of fluid between the pressure chambers for the purpose of damping relative movement of the suspension components.

An annular land forms a valve seat at one end of the piston and surrounds one end of one of the flow control passages. A valve element is pushed toward a seated condition against the valve seat by a composite spring construction. The composite spring includes a primary coil spring which urges the valve element toward a seated position. A secondary spring of the Belleville type engages the end of the coil spring and exerts a spring force which tends to counteract the force of the coil spring. Thus, the total force urging the valve element to a seated condition is the cumulative force of the primary and secondary springs.

The Belleville secondary spring is made out of aluminum rather than conventional hard spring steel. It is designed to progressively lose its spring force upon repeated flexing which occurs during the cycling of the shock absorber in the vehicle. When the secondary spring loses its spring force, the cumulative or total force of the primary and secondary springs urging the valve element to a seated condition increases. An increase in cumulative spring force produces a corresponding increase in the restriction to the flow of fluid through the flow control passage. In a vehicle suspension where the frictional damping of the suspension components decreases during usage the present shock absorber will compensate for such loss of friction damping by becoming stiffer as the secondary Belleville bell spring loses its resiliency.

BRIEF SUMMARY OF THE DRAWINGS

The many objects and advantages of a shock absorber in accordance with the present invention will become apparent upon consideration of the following discussion and the accompanying drawings, in which:

FIG. 1 is an elevational sectional view of a hydraulic shock absorber for a motor vehicle in accordance with this invention;

FIG. 2 is an enlarged sectional view of the piston construction of the shock absorber of FIG. 1;

FIG. 3 is an elevational view of the piston rod, the piston rod seal structure and an exploded view, in section, of the piston;

FIG. 4 is a plan view of the jounce valve element;

FIG. 5 is a sectional view taken along section line 5—5 of FIG. 4 of a portion of the jounce valve element;

FIG. 6 is a plan view of the rebound valve element;

FIG. 7 is a sectional view taken along section line 7—7 of FIG. 6 of the rebound valve element;

FIG. 8 is a plan view of the secondary rebound valve spring; and

FIG. 9 is a sectional view taken along section line 9—9 of FIG. 8 of the secondary rebound valve spring.

DETAILED DESCRIPTION OF A PREFERRED EMBODIMENT

Referring now to the drawings, wherein the presently preferred embodiment of this invention is illustrated, FIG. 1 shows a hydraulic shock absorber for use in a motor vehicle for the purpose of damping jounce and rebound movement of vehicle suspension components. The shock absorber 10 includes a pressure tube 12 that is closed at its lower end by a foot valve assembly 14. A piston assembly 16 is slidably disposed within the pressure tube 10. A piston rod 18 has its lower end connected to the piston assembly 16 and extends upwardly out of the shock absorber. An annular piston rod guide 20 slidably supports the piston rod 18 and closes the upper end of the pressure tube 12. The piston assembly 16 divides the interior of the pressure tube into rebound and jounce pressure chambers 22 and 24.

A reservoir tube 26 is concentrically disposed about the pressure tube 12 and forms an annular reservoir chamber 28 therewith. The lower end of the reservoir tube 26 is closed by a closure member 30 having a generally cup shape and circumferentially spaced apart raised portions 32 that engage the foot valve assembly 14. The closure member 30, including its raised portions 32, maintains tube 26 concentric with respect to the pressure tube 12. The spaces between the raised portions 32 provide communication between the reservoir chamber 28 and the area 34 situated directly beneath the foot valve assembly 14.

The rod guide 20 has a cylindrical upper portion 36 upon which a cup shape upper closure member 38 is seated. The closure member 38 has a depending flange portion that is in rigid sealed engagement with the upper end of the reservoir tube 26. As seen in the drawings, the guide 20 in addition to slidably positioning the piston rod 18 also maintains the reservoir tube 26 concentric with respect to the pressure tube 12. A rubber sealing element 42 of annular configuration surrounds the piston rod 18 and is urged upwardly against the closure member 38 by means of a coil spring 44 that is interposed between the piston rod guide 20 and a washer 46 that bears against the seal 42. A passage 48 is provided in the rod guide 20 to permit fluid escaping from the rebound chamber 22 to flow back to the reservoir chamber 28. With this construction, the seal 42 is not subjected to the high hydraulic pressures that are present in the rebound chamber 22 during the operation of the shock absorber.

Referring to FIG. 2, the piston assembly 16 includes a piston element 50 having a circumferentially arranged series of rebound passages 52 formed therein. The element 50 also includes a circumferential series of jounce passages 54 that are spaced outwardly from the rebound passages 52. On the rebound pressure chamber side of the piston element 50, inner and outer annular lands 55 and 56 surround the jounce passages 54. A jounce valve element 57 (the construction of which will be described in greater detail later) engages the valve seats 55 and 56 formed by the inner and outer lands and is urged to a seated condition by star shape valve spring 58. A washer shape member 59 engages a shoulder 61 formed on the piston rod 18 and engages the hub of the star shape spring 58.

On the jounce chamber side of the piston element 50, an annular land 62 surrounds the rebound passages 52. A rebound valve element 63 (the construction of which will be described in greater detail later) is seated against the valve seat formed by the land 62. The rebound valve element 63 is held against its valve seat 62 by the cumulative force of primary and secondary valve springs. A Belleville spring 64 constitutes the secondary spring and is positioned against the rebound valve element 63 and exerts a spring force upon an annular valve seat 66. A nut 67 threadedly engages the end of the piston rod 18 and has an outwardly extending flange 68 that forms another spring seat. A coil spring 69, which constitutes the primary valve spring, is interposed between the flange 68 of the nut and the annular valve seat 66.

The tightening of the nut 67 secures the various valve elements and valve springs and the piston body to the end of the piston rod 18.

Referring to FIGS. 4 and 5, the jounce valve element 57 has a generally circular outer portion 71 and a generally circular inner portion 72 that is spaced apart from the outer portion 71. The hole 70 defined by the circular portion 72 accommodates the end of the piston rod 18. The portions 71 and 72 are joined by an interconnecting portion 73. The crescent shape space formed between the outer and inner portions 71 and 72 is aligned with the upper end of the rebound passages 52 so as not to interfere with the flow of fluid therethrough.

The jounce valve element 57 has a thin spring metal backing 74 to which an organic facing material 75 is bonded. The facing 75 is provided with a diametrical gap 76 that exposes the surface of the metal backing 74.

The organic facing may be made of a suitable polyamide resin such as nylon. Other resins having the desired plastic deformability characteristics may also be used. A compound of rubber would make an effective organic facing.

When the jounce valve element 57 is properly positioned in the piston assembly 16, the organic facing 75 engages the annular valve seats 55 and 56. Due to the presence of the gap 76 in the facing material 75, restrictive orifices are defined by the gap 76, the metal backing 74 and the valve seats 55 and 56.

The rebound valve element 63 is of generally annular shape and has a spring metal backing portion 78. The hole 77 in the center of the valve element 63 accommodates the end of the piston rod 18. An organic material facing 79 is bonded to the surface of the metal 78. The organic facing 79 is provided with spaced edges that define a diametrically arranged gap 81. The material of the facing 79 is the same as the material 75 of the jounce valve element 57. When the rebound valve element 63 is positioned against the lower side of the piston 50, the organic facing 79 engages the annular valve seat 62.

The gap 81 cooperates with the valve seat 62 to form restrictive flow orifices each having one dimension equal to the thickness of the facing 79. The organic facing 79 holds the surface of the metal backing 78 spaced apart from the valve seat 62 and the gap 81 in the facing 79 provides restrictive orifices through which fluid may flow.

OPERATION

The hydraulic shock absorber 10 illustrated in the drawing is constructed to be interposed between the sprung and unsprung members of a vehicle suspension system. The upper end of the piston rod is designed to be connected to a sprung vehicle component such as a frame or body member. The lower end of the closure member 30 is constructed to be connected to an unsprung suspension component such as a suspension arm.

When the shock absorber 10 is interposed between the sprung and unsprung suspension components of a motor vehicle, the piston assembly 16 will reciprocate within the pressure tube 12 during jounce and rebound movement of the suspension. The shock absorber 10 is filled with hydraulic fluid and as the piston 16 moves within the pressure tube 12, fluid will be forced through the several restrictive orifices to dampen the jounce and rebound movement.

During a jounce stroke, the piston 16 will move downwardly. Fluid will flow from the jounce chamber 24 to the rebound chamber 22 through the jounce passages 54 and through the restrictive orifices formed by the gap 76 in the organic facing 75 of the jounce valve element 57. Fluid will also flow from the jounce chamber 24 to the rebound chamber 22 through the restrictive orifices formed by the gap 81 in the organic facing 79 of the rebound valve element 63. If the pressure in the jounce chamber 24 is sufficiently high, the jounce valve element 57 will move to an open position against the force of the star shape spring 58 whereby the organic facing 75 will be spaced apart from the annular valve seats 55 and 57. This will permit the escape of hydraulic fluid from the jounce chamber 54 to the rebound chamber 52. When the pressure ceases the spring 58 will cause the valve element 57 to snap back into engagement with the annular valve seats 55 and 56.

Upon repeated cycling of the shock absorber and the repeated movement of the jounce valve element 57 from an open to a seated position, plastic deformation of the organic facing 75 will occur. Progressively and gradually during usage of the shock absorber 10, the pounding of the valve element 57 against the valve seats 55 and 56 will cause creases or grooves to be formed in the organic facing 75. As these grooves are formed, the depth of the gap 76 will decrease whereby the size of the restrictive orifices formed by the gap 76 (in association with the valve seats 55 and 56) will be decreased whereby the restriction to fluid flow through the jounce passages 54 will be increased gradually and progressively during the service life of the shock absorber.

During a rebound stroke, when the piston 16 is moving upwardly in the pressure tube 12, fluid will flow through the rebound passages 52, through the restrictive orifices formed by the gap 81 in the organic facing 79 of the rebound valve element 63. Fluid will also flow from the rebound chamber 22 to the jounce chamber 24 through the jounce passages 54 as permitted by the restrictive orifices formed by the gap 76 in the organic facing 75 of the jounce valve element 57.

During a rebound stroke the pressure in the rebound chamber 22 will cause the valve element 63 to move out of engagement with the valve seat 62 against the cumulative force of the Belleville spring 62 and the coil spring 69. When the fluid pressure is relieved, the rebound valve element 63 will snap back into engagement with the valve seat 62. During the service life of the shock absorber 10, the repeated contact of the organic facing 79 with the annular land 62 will cause a groove to be formed in the organic facing. The material of the facing 79 will be plastically deformed progressively and gradually during the life of the shock absorber so that the size of the restrictive orifices formed by the gap 81 will be progressively and gradually decreased.

By way of example, the organic facings 75 and 79 may have a thickness in the range of 0.0020 to 0.0035 inch. One dimension of each orifice formed by the gaps 76 and 81 in the facings 75 and 79 will be equal to the thickness of the facing where it is in contact with the respective valve seat. Initially, that dimension will be 0.0020 to 0.0035 (or whatever thickness the facing has), however, after continual opening and closing of the valve elements and the formation of grooves in the facings 75 and 79 by the valve seats, that dimension of the orifices will gradually approach zero.

Thus, during the service life of the shock absorber 10, the restrictive orifices formed by gap 81 in the organic facing 79 of rebound valve element 63 and the restrictive orifices formed by the gap 76 in the facing 75 of the jounce valve 57 will gradually and progressively be reduced in size. As a consequence, the shock absorber 10 will become progressively stiffer during its service life with respect to both jounce and rebound movement.

The rebound valve element 63 moves off of the valve seat 62 during a rebound stroke against the cumulative force exerted by the Belleville spring 64 and the coil spring 69. The spring 69 is a primary spring exerting a dominant force urging the rebound valve element 63 to a seated condition. The Belleville spring 64 is a secondary spring and exerts a force tending to counteract the force of the coil spring 69. Thus, the total force exerted by the two springs urging the valve 63 against its seat is less than the force exerted by the coil spring 69 alone. During the service life of a shock absorber, the Belleville valve spring 64 will be repeatedly flexed. This spring is formed of aluminum or similar material and repeated flexure will cause a permanent set to progressively take place in the spring. That is, the spring force resisting the coil spring 69 will progressively and gradually decrease during the service life of the shock absorber 10. With a reduction in counteracting force, the total force or cumulative force of the two springs 64 and 69 urging the valve 63 against its seat will progressively and gradually increase during the service life of a shock absorber. An increase in the cumulative force urging the rebound valve element 63 to a seated position will result in the shock absorber 10 being more resistant to rebound movement and, therefore, having the capacity to compensate for any loss of friction damping in the suspension.

An annular fatigue groove 82 may be provided in the Belleville spring 64 to enhance the ability of the spring 64 to lose its resiliency and counteracting force.

The organic facings for the jounce and rebound valve elements 57 and 63 may be formed of nylon or rubber. It will be appreciated that other organic materials that are subject to plastic deformation in response to repeated pounding by a valve seat are also acceptable.

The foot valve 14 is similar in construction and operation to the foot valve described in U.S. Pat. No. 2,691,387 to J. N. Strauss. During a compression stroke when the piston assembly 16 is travelling downwardly in the pressure tube 12, the jounce chamber 24 will be reduced in size. Fluid will flow from the jounce chamber 24 through the valving of the foot valve 14 to the reservoir chamber 28 in an amount equal to the fluid displaced by the piston rod 18. During a rebound stroke when the piston assembly 16 is moving upwardly in the pressure tube 12, fluid will be drawn through the replenishing valve passages of the foot valve assembly 14 into the jounce chamber 24 from the reservoir chamber 28 in an amount equal to that which was displaced by the piston rod 18 as it is withdrawn from the pressure tube 12.

A shock absorber in accordance with this disclosure will become progressively stiffer during usage whereby the reduction in friction damping that occurs during the service life of a vehicle suspension system will be compensated for.

The foregoing description presents the presently preferred embodiment of this invention. Modifications and alterations may occur to those skilled in the art that will come within the scope and spirit of the following claims.

I claim:

1. A hydraulic shock absorber constructed to become stiffer during usage having first and second fluid chambers and flow control means constructed to provide a restictive fluid passage for the controlled flow of hydraulic fluid from said first chamber to said second chamber;

said flow control means including a fluid passage, a valve seat positioned about one end of said passage and a valve element;

spring means exerting a cumulative spring force upon said valve element urging said valve element into seated engagement with said valve seat;

said spring means comprising a primary spring exerting a spring force urging said valve element toward said seated position and a secondary spring exerting a spring force tending to counter the force of said primary spring on said valve element;

said secondary spring having a service life substantially less than the service of said primary spring whereby the cumulative force of said primary spring and said secondary spring increases during the service life of said shock absorber;

said secondary spring comprising a Belleville spring having an annular fatigue groove constructed to cause said spring force exerted by said secondary spring to be substantially reduced during repeated flexing of said secondary spring.

2. A hydraulic shock absorber constructed to become stiffer during usage having first and second fluid chambers and flow control means constructed to provide a restictive fluid passage for the controlled flow of hydraulic fluid from said first chamber to said second chamber;

said flow control means including a fluid passage, a valve seat positioned about one end of said passage and a valve element;

spring means exerting a cumulative spring force upon said valve element urging said valve element into seated engagement with said valve seat;

said spring means comprising a primary spring exerting a spring force urging said valve element toward said seated position and a secondary spring exerting a spring force tending to counter the force of said primary spring on said valve element;

said secondary spring having a service life substantially less than the service of said primary spring whereby the cumulative force of said primary spring and said secondary spring increases during the service life of said shock absorber;

said primary spring comprising a coil spring manufactured from hardened spring steel material;

said secondary spring comprising a Belleville spring manufactured from a material that is less hard than the material of said primary spring;

said secondary spring having an annular fatigue groove constructed to cause the spring force exerted by said secondary spring to be substantially reduced during repeated flexing of said spring.

3. A hydraulic shock absorber for a motor vehicle suspension having a sprung vehicle component and an unsprung vehicle component;

said shock absorber having a pressure tube;

a piston slidable within said pressure tube dividing the interior of said tube into jounce and rebound fluid pressure chambers;

said piston being constructed to be connected to one of said components and said pressure tube being constructed to be connected to the other of said components;

said piston having fluid passage means constructed for the controlled flow of hydraulic fluid from one of said chambers to the other of said chambers;

said piston having an annular valve seat positioned about one end of said passage means;

a valve element and spring means urging said valve element into seated engagement with said valve seat;

said spring means comprising a primary spring exerting a spring force urging said valve element toward said seated position and a secondary spring exerting a spring force tending to resist the force of said primary spring on said valve element;

said second spring having a service life substantially less than the service of said primary spring and said secondary spring increases during the service life of said shock absorber;

said primary spring comprising a coil spring manufactured from hardened spring steel material;

said secondary spring comprising a Belleville spring manufactured from a material that is less hard than the material of said primary spring;

said secondary spring having an annular fatigue groove constructed to cause the spring force exerted by said secondary spring to be substantially reduced during repeated flexing of said spring.

* * * * *